United States Patent [19]

Gardner et al.

[11] 4,137,894
[45] Feb. 6, 1979

[54] PNEUMATIC TIRE, RIM AND RUN-FLAT SYSTEM COMBINATION

[75] Inventors: James D. Gardner, Akron; James P. Lawrence, Wadsworth, both of Ohio

[73] Assignee: The Firestone Tire & Rubber Company, Akron, Ohio

[21] Appl. No.: 807,609

[22] Filed: Jun. 17, 1977

[51] Int. Cl.² ............................................ B60C 17/00
[52] U.S. Cl. ............................ 152/330 RF; 152/340
[58] Field of Search ............... 152/158, 339, 340, 329, 152/330 RF

[56] References Cited

U.S. PATENT DOCUMENTS

| | | | |
|---|---|---|---|
| 1,215,717 | 2/1917 | Ruthven | 152/158 |
| 1,626,511 | 4/1927 | Clark | 152/400 |
| 1,626,512 | 4/1927 | Clark | 152/400 |
| 2,169,041 | 8/1939 | Gammeter | 152/339 |
| 2,224,066 | 12/1940 | Shore | 152/158 |
| 3,113,604 | 12/1963 | Connor | 152/418 |
| 3,142,326 | 7/1964 | Lindley | 152/158 |
| 3,225,811 | 12/1965 | Hawkes | 152/340 |
| 3,508,596 | 4/1970 | Blair | 152/340 |
| 4,008,743 | 2/1977 | Welch | 152/158 |

FOREIGN PATENT DOCUMENTS

| | | | |
|---|---|---|---|
| 502594 | 5/1954 | Canada. | |
| 1135637 | 5/1957 | France | 152/340 |
| 1163953 | 10/1958 | France | 152/340 |
| 615076 | 12/1948 | United Kingdom. | |
| 679642 | 9/1952 | United Kingdom. | |

*Primary Examiner*—L. J. Paperner
*Assistant Examiner*—Carl Rowold

[57] ABSTRACT

This disclosure relates to a tire and rim combination having run-flat capabilites. These capabilities are provided by a run-flat support system which is comprised of a pneumatic tube member located in the drop center area of the rim and an annular, "free-floating" ring member riding on the tube which contacts only the tube when the tire is operating under normal conditions and only the tube and inner periphery of the tread area of the tire when the tire is run flat.

8 Claims, 2 Drawing Figures

FIG. 1
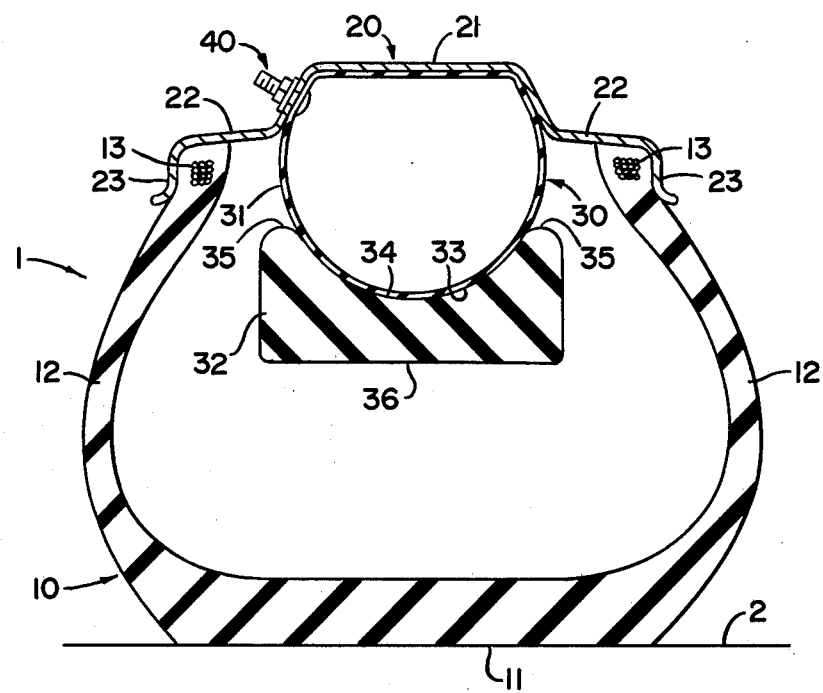
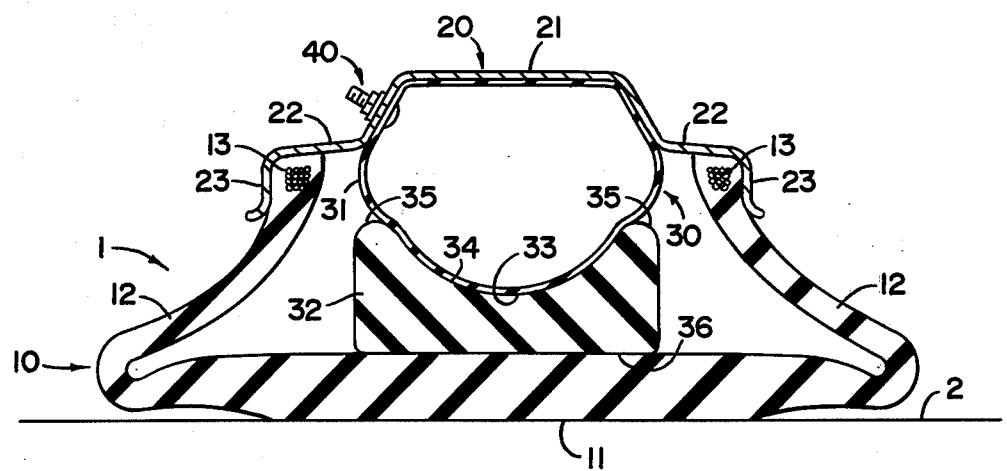
FIG. 2

PNEUMATIC TIRE, RIM AND RUN-FLAT SYSTEM COMBINATION

BACKGROUND OF THE INVENTION

This invention relates to a tire and rim combination having run-flat capabilities. The invention is directed to the problem of providing a tire and rim combination which will permit the elimination of the spare tire in a vehicle.

In recent years much emphasis has been placed on programs to provide tires with run-flat capabilities. This emphasis is a direct result of the energy shortages, both actual and predicted, that are presently a major concern of our society. One of the energy conservation matters that is being investigated is the elimination, or substitution, of the spare tire in vehicles. Pneumatic tires are comprised of several petroleum-based components so that a real conservation can be realized by the elimination of the spare tire. The resultant decrease in vehicle weight will also save gasoline.

The spare tire elimination proposals necessarily include that the tires on the vehicle have the capability of running flat when a tire problem occurs so that the vehicle may be driven to a lace of safety for the proper repair or replacement. Surveys have shown that 90% of the time a motorist is within 12 to 15 miles of some facility which can assist in any tire-related problems.

In addition to the capabilities set out above, a run-flat system must provide a tire and rim structure that has sufficient stability in its run-flat condition to permit the automobile to be driven safely to the repair facility. The system should also have the capability of preventing further injury to the tire in its run-flat operation so that the tire may be repaired and will not be lost by its run-flat operation.

One of the primary drawbacks of prior run-flat systems which contain internal crutch type members in the air chamber defined by the tire and rim is the complexity of such members. The combination of this invention is simple from the structural and installation aspects and is inexpensive. It requires no complex metal bolting operations.

Another major drawback of prior systems is the mounting and dismounting difficulty that these systems entail. The prior internal crutch type systems have required cumbersome and expensive mounting procedures that have made these systems unattractive from an economic and servicing convenience standpoint.

A further drawback of prior systems has been the necessity for special tires and particularly for special rims with unique features (such as split rims) so that conventional, standard tires and rims would not be workable in the prior systems. This represents a major disadvantage of prior systems as it makes all existing rims obsolete.

A further drawback of prior crutch type systems is the additional weight that these systems add to the tire and rim combination. The present invention is simple and lightweight compared to these prior systems.

In the present invention the performance requirements set out above are realized and the drawbacks set out above are overcome. This invention comprises a tire and rim combination having a run-flat support system located in the air chamber defined by the tire and rim. This run-flat support system is comparised of an annular, pneumatic tube member mounted in the drop center area of the rim and a rigid, or semi-rigid, ring member riding on the tube and located so that it will contact only the tube member, not the tire sidewalls or rim, when the combination is operated under normal operating conditions and will contact only the tube member and the inner periphery of the tread area of the tire when the combination is run flat. Due to this lack of contact of the ring member with the tire bead or sidewall areas or the rim during the normal or run-flat operations, the ring is characterized as "free-floating".

The concept of having a pneumatic tube located between the bead bundles of a pneumatic tire has been taught by U.S. Pat. Nos. 1,215,717; 1,626,514 and 2,224,066. These teachings also disclose an annular protective member located axially outwardly of the pneumatic tube. The structure of the present invention is distinguishable from these references in that the ring member of this invention contacts only the tube during normal operation of the combination and contacts only the tube and the inner periphery of the tread portion of the tire when the tire is run flat. In the structures of these references the ring member is connected to or in contact with the rim flange or the tire bead and is, therefore, not free-floating.

The structure of this invention, due to the "free-floating" nature of the ring member and the support of the ring member by the pneumatic tube member, permits the run-flat support system to act as a shock absorber when the tire is run flat, cornered hard or bottoms-out. This feature minimizes the transmission of shocks or these type to the rim and to the vehicle itself. This feature is not present in these prior teachings due to the fact that the protective ring member of the prior teachings is tied into or in contact with either the tire or rim or both.

It is an object of this invention to have a tire, rim and run-flat support system combination that will permit the tire to be operated in a run-flat condition without damage to the tire.

It is a further object of this invention to have a tire, rim and run-flat support system combination that has sufficient stability when the tire is in its run-flat condition to permit safe operation and handling of the vehicle to a location where assistance may be obtained.

It is a further object of this invention to provide a tire, rim and run-flat support system combination wherein standard tires and rims may be utilized.

Another object of this invention is to provide a tire, rim and run-flat support member system combination that is simple to manufacture and lightweight so that an excessive amount of heat will not be generated by the system.

Another object of this invention is to combine a tire, rim and run-flat support member system combination that permits easy mounting and dismounting of the tire.

DESCRIPTION OF THE INVENTION

Both the tire and the rim utilized in the combination of this invention may be of any standard type. The novelty of this combination does not reside in any particular tire or rim feature. This is one of the major advantages of this invention in that standard tires, and particularly standard rims, are not made obsolete by this invention.

The novel features of this invention reside in the run-flat support system and its structural relationships to the tire and rim. The run-flat support system is comprised of two members. The first is a pneumatic tube that is located in the drop center area of the rim. It is important that this tube not be in contact with any portion of the tire when the combination is operating under normal conditions.

The second member is a ring member. The ring member is located radially outwardly of the tube and is in contact with the tube or riding on the tube. The ring member serves as a restriction band to prevent the radial expansion of the tube.

During the run-flat operation of this system, the tube bears the total weight of the ring member and the vehicle. In order for the tube with its smaller dimensions to have adequate load carrying capabilities when the tire is run flat, the tube must have a cold internal air pressure of between 40 and 80 psi. This is compared to the standard 24 to 40 psi used in the tire cavity depending on the size of the tire. The inflation pressure relationship between the tube and tire cavity is directly proportional; that is, as the inflation pressure in the tire cavity is increased (due to a larger size tire), the inflation pressure in the tube is increased to insure that the tube has adequate load carrying capabilities for the larger tire. This differential in air pressure is an important feature of this combination as it provides the smaller tube with the necessary load carrying capabilities. This is necessitated by the fact that the ring member is supported solely by the tube and is not in contact with the rim or the bead or sidewall areas of the tire.

The tube contains reinforcing members of fabric which are coated with a rubber skim coating. The rubber skim coating may be any of the standard ones used in tire body constructions. The fabric reinforcing members or cords may be of rayon, nylon, fiberglass, aramid or polyester materials. The angle of these cords should be no greater than 50° from the axis of rotation of the tire and rim combination. Greater bias angles have been found to be troublesome during the mounting operation of the tube in that the tube will not expand as readily to go over the rim flange.

Preferably the internal diameter of the tube is less than the overall diameter of the rim flange and about equal to the diameter of the drop center area of the rim on which it rests. This means the tube is required to have enough expansion to stretch over the rim flange when it is mounted on the rim.

The ring member which cooperates with the tube member to form the run-flat support system may be made of any material that has sufficient modulus to resist elongation at temperatures of up to 300° F.; the possible contained air temperature in the tire cavity. It is important for the ring to retain its integrity at these high temperatures so that it performs its restrictive function on the tube. A modulus of 550-600 psi at 10% elongation has been found to be sufficient with a molded polyurethane. It is believed that a range of 200 to 1000 psi at 10% elongation is sufficient, depending upon the material used.

Materials which have been found to meet these requirements are plastics, such as polyurethane or some fiberglass-reinforced plastics. Other materials which are known to possess this limitation are Hytrel, a material produced by DuPont and marketed under this trademark, and rubber compounds which have been compounded to have a high modulus with sufficient flexibility.

The location of the ring member in the combination is critical. It must not come into contact with the rim portion of the combination at any time either during the run-flat operation of the combination or when the combination is operating under normal conditions. It must not come into contact with the tire bead areas or sidewall areas during the operation of the combination in either its run-flat condition or its normal condition. These limitations are accomplished by having the section height of the ring member between 40 and 70% of the section height of the tire when the system is operational with the tube inflated to its normal pressure and the tire inflated to its normal pressure. Likewise, the section width of the ring should be between 30 and 60% of the section width of the tire when the tire is inflated under standard conditions. Preferably, the section width of the ring member should be approximately 40% of the section width of the tire, depending on ring material properties.

The relationship of the contour of the inner surface of the ring to the external contour of the inflated tube is important. As will be explained later in the mounting procedure, the ring must have a self-centering capability so that the simple mounting procedure utilized in this invention may be realized. It has been found that the internal surface of the ring should be concave in relation to the tube which has an external convex contour. The radius of the concave internal surface of the ring should be greater than the radius of the external surface of the tube's cross-section to permit this self-centering feature.

The ring may contain a material which bleeds to the surface of the ring and acts as a lubricant when the tire is run flat. This lubricant will be present at the interface between the ring and the internal periphery of the tire tread. Materials such as linseed oil and castor oil are acceptable for this purpose and will bleed from the materials that are used in the ring member.

One of the major drawbacks in prior run-flat systems has been the fact that the operator of the vehicle may not be aware of the fact that the tire has gone flat. The ring member may be provided with a flat spot which will cause a sufficient irregularity in the system during its run-flat operation to warn the operator that one of his tires is flat.

A further warning will be given to the driver if this run-flat support system becomes inoperable by the tube being deflated. This malfunction of the tube will cause a sufficient out-of-round condition that the operator will be warned of the existence of a problem so that proper remedies may be taken.

The clearance between the ring member as set out above in the tire is important. This clearance must be sufficient so that the tire will not bottom-out during normal operation. In this context, bottom-out means that the tire will not come in contact with the ring member when it is operating under normal conditions and encounters irregularities in the road surface.

A unique embodiment of the concept of this invention may be realized by having the tube attached to the ring member prior to installation into the cavity. The tube will then be inflated downwards during the mounting operation. This will eliminate one step in the mounting operation required in this invention.

Another feature that is accomplished by the combination of this invention is the feature wherein the presence of the tube in the drop center area of the rim will prevent the tire beads from relocating into this area when the tire is run flat. When the tire beads slip into the drop center area of the rim, an unstable condition is created so that vehicle handling is difficult. This slippage may also be prevented by providing the rim with annular, radially outwardly extending humps or ridges between the mounted tire bead and the drop center area of the rim. These humps are designed to present an obstruction to the slippage of the tire bead from the rim bead seat into the drop center area of the rim.

One of the primary advantages of the combination of this invention is its simplicity and the ease with which mounting or dismounting of the tire may be accomplished. It has long been desired to have an internal crutch type system in which assembly line mounting methods, as used by vehicle manufacturers, could be employed. All prior crutch type members, due to their complex nature, have not provided even the promise of this capability. The combination of the present invention provides great promise in this area. It is envisioned that standard production line techniques may be adapted to fit the combination of this invention.

A mounting procedure which has been successfully employed with the combination of this invention is set out below:

1. The ring member of the run-flat support system is placed inside the inflation cavity of the tire. This is accomplished by bending the ring member into an oval shape and inserting one portion of the member into the tire cavity and allowing the remainder to snap into the cavity.
2. A first bead of the tire is mounted over a rim flange by standard techniques.
3. The tube member of the run-flat support system is partially inflated, forced over the exposed rim flange and located in the drop center area of the rim. The expansion of the internal diameter of the tube permits this installation.
4. The tube is deflated.
5. The second bead is mounted on the rim using standard techniques and procedures.
6. The tire is turned upside down to expose the inflation valve for the tube.
7. The tube is inflated to its operable pressure. Due to the physical location of the ring member (it is restricted by the tire beads) in relationship to the tube and the relationship of the contours of the contiguous parts of the tube and ring, the ring member is automatically centered on the tube during inflation of the tube. This feature has been demonstrated several times in the practice of this invention. This self-centering feature of the ring is a result of the restricted location of the ring at this time in the mounting operation and the contour relationships between the internal surface of the ring and the external surface of the inflated tube.

It is envisioned that some of these steps may be eliminated by the preassembly of certain pieces. For example, the tube may be preassembled to the rim and be resting in the drop center area of the rim when the tire is mounted. This may require a rim with a deeper drop center area or may be accomplished with present rims.

DETAILED DESCRIPTION OF THE INVENTION

FIG. 1 is a cross-sectional view of the combination of this invention showing the combination with the tire under standard conditions of inflation pressure and load;

FIG. 2 is a cross section of the combination of this invention similar to FIG. 1 showing the tire in its deflated, loaded, run-flat condition.

In FIG. 1 the combination of this invention is shown generally as 1 with its tread area being in contact with road, 2. The tire comprises road-engaging tread surface, 11, and sidewalls, 12, extending from the road-engaging tread area to terminate in the bead areas which contain the annular bead bundles, 13. The structural features of this tire are standard and do not form part of the novelty of this combination. The tire may be any of the standard radial or bias or belted-bias types.

The rim of this combination is shown generally as 20 with its annular drop center area, 21, bounded laterally by annular bead seats, 22, which terminate in annular rim flanges, 23. The structural features of the rim form no part of the novelty in this combination. The rim may contain any of the known standard structural features.

The run-flat support system is shown generally as 30. It is comprised of the annular pneumatic tube member, 31 and a ring member, 32. The tube member is located in the drop center area, 21, of rim, 20. The contour of the outer diameter of the tube is shown at 33.

The ring, 32, is located radially outwardly of the tube member and in contact with or riding on the tube member. There must be sufficient clearance between the inner diameter of the ring member and the rim to prevent the ring from contacting the rim during the run-flat operation of the system. This is shown in FIG. 2 and will be discussed later. The contour of the inner surface of the ring is shown at 34. This contour must have the earlier described relationship to the external contour, 33, of the inflated tube, 31, so that the self centering feature of this invention is realized. This relationship also provides stability to the tube-rim structure when the tire is run flat so that the ring will not be pushed off-center of the tube during the run-flat operation.

The ring 32 is provided with radially inwardly extending protrusions, 35, which facilitate the self-centering feature and the operational stability feature.

The outer surface of the ring, 36, is the surface which comes in contact with the inner periphery of the road-engaging tread surface. This is demonstrated in FIG. 2.

FIG. 1 shows valve, 40, as the inflating means for tube 31. The standard inflation valve for the tire cavity is not shown. It is envisioned that a valve system can be utilized with the combination of this invention wherein one valve may be designed to inflate both the tube and the tire cavity.

The section width of the ring, 32, is the maximum lateral distance of the ring. In the drawing it would be the lateral distance of the external surface of the ring, 36. The section width of the tire is the maximum lateral distance between the tire sidewalls as measured by a line parallel to the axis of rotation of the combination when the tire is inflated under standard conditions and not under load.

The section height of the tire is the maximum radial distance from the bead seat of the rim to the radially outermost point of the tire tread when the tire is mounted on the rim, inflated to standard conditions and not under load. The section height of the ring member is the maximum radial distance from the bead seat of the rim to the radially outermost point of the ring member when the tube is inflated to its standard pressure and the ring is in its operable location. In FIG. 1 this distance is represented by the radial distance from the bead seat, 22, to the outer surface of the ring, 36.

In the combination of this invention the section height of the ring should be between 40 and 70% of the section height of the tire. The section width of the ring should be between 30 and 60% of the section width of the tire, preferably 40%. These ratios are based upon the definitions set out above.

FIG. 2 represents the combination of this invention when the tire is deflated and being run flat. The reference numbers in FIG. 2 are identical to the reference numbers in FIG. 1 and refer to the same components in the combination. In the run-flat relationship shown in FIG. 2 the ring member, 32, is supported solely by the tube member, 31, so that, during this run-flat operation, the ring member does not come in contact either with the rim, 20, or the tire, 10, except where the external surface of the ring, 36, contacts the internal periphery of tread area, 11, of the tire.

The relationship in FIG. 2 clearly demonstrates that the ring member is "free-floating" and does not contact any rigid portion of the combination in the radially inward direction. This free-floating feature results in the advantages claimed for this combination as set out earlier in the specification. It is essential that the tube have sufficient internal pressure to support the weight of the vehicle in this run-flat condition. so that the ring does not come in contact with the rim or the bead areas of the tire. The radial distance between ring protrusions, 35, and the rim, 20, and the tire bead areas must be maintained so that contact does not occur.

The combination of this invention has been utilized and the utility thereof demonstrated in an HR78-15 size tire. This tire has a section width of 8.45 inches and a section height of 6.59 inches under standard inflation conditions and no load. The particular tire utilized had a steel-belted radial construction having two body plies of polyester cords and two belt plies of steel cords. The cords in the body plies were radial and the cords in the belt plies had an angle of approximately 34° to the circumferential centerline of the tread. The structural features of this tire were standard and represented the present commercial production of the Applicants' company.

This tire was mounted on a standard rim having a 15 inch overall diameter and a rim width of 6 inches. The rim represented standard, commercial rims that are presently in use and recommended for the size and type of tire defined above.

The tube member of the run-flat support system that was utilized with this combination of tire and rim had an inflated cross-sectional diameter of 3 inches and an inflated overall diameter of 18 inches. This inflated outer diameter corresponded approximately to the fixed internal diameter of the ring. The inflated radius of the external shape of the tube was 1.5 inches.

In its cured configuration the tube had an internal diameter of 13 inches and an outer diameter of 15 inches. This internal diameter corresponded to the outer diameter of the drop center area of the rim.

The tube was comprised of a rubber coated reinforcing fabric of rayon cords. The cords were disposed parallel to the axis of rotation of the combination, or what is referred to in the art as "radial". The rubber skim coating on the fabric reinforcement of the tube was a standard type utilized by the Applicants' company.

The ring was 3.5 inches wide at its widest point with a thickness of 0.8 inches at its center. It was a molded polyurethane having a modulus of 580 psi at 10% elongation. The outer diameter of the ring was 20.5 inches.

The radius of the concave contour of its internal surface was 2 inches. This radius, in combination with the corresponding radius of the inflated tube, provided the self-centering feature of the ring during the mounting operation and the stability feature when the combination is run flat.

The specific combination set out above was mounted by the mounting procedure described earlier in the specification. This combination has been run flat for a distance of 22.5 miles at 30 to 40 miles an hour. The run flat stability of the combination was excellent with no problems in handling. The tire was not structurally damaged after this run flat test.

In this specific combination, the tube was inflated to 60 psi and the tire cavity to 24 psi. The section width of the ring was 41% and the section width of the tire. The section height of the ring in its operable condition was 42% of the section height of the tire.

We claim:

1. In combination, a pneumatic tire, a rim and a run-flat support system, said pneumatic tire comprising an annular tread portion and sidewalls connecting the lateral edges of said tread to bead areas which contain annular bead bundles, said rim comprising an annular drop center area having laterally extending bead seats on either side thereof which terminate in rim flanges, said run-flat support system comprising a pneumatic tube member and a separate, free-floating ring member, said tube member located in the drop center area of said rim and said ring member located radially outwardly of said tube in contact with said tube, said tube member having a fabric reinforcement with the cords of said fabric disposed substantially parallel to the axis of rotation of said combination, said ring member supported solely by said tube during both the normal and run-flat operation of said combination so that said ring member does not contact said rim or said tire sidewalls or bead areas when the tire is either under normal load or run-flat.

2. The combination of claim 1 in which the maximum section height of said ring member is 40 to 70% of the maximum section height of said tire when inflated under standard conditions.

3. In the combination of claim 1 wherein the maximum section width of said ring member is 30 to 60% of the maximum section width of said pneumatic tires when it is inflated under standard conditions.

4. The combination of claim 1 wherein said tube member contains a higher inflation pressure than the tire cavity defined by said pneumatic tire and said rim.

5. The combination of claim 4 wherein said tube member is inflated to between 40 and 80 pounds per square inch.

6. The combination of claim 1 wherein the outer periphery of said ring member contains a lubricating substance to prevent abrasion between said ring member and the inner periphery of said tire when the tire is run-flat.

7. The combination of claim 1 wherein the internal surface of said ring member is concave and the external surface of said tube member is convex.

8. The combination of claim 7 wherein the radius of said concave surface of said ring member is greater than the radius of said convex surface of said tube member.

* * * * *

UNITED STATES PATENT OFFICE
CERTIFICATE OF CORRECTION

Patent No. 4,137,894            Dated February 6, 1979

Inventor(s) James D. Gardner & James P. Lawrence

It is certified that error appears in the above-identified patent and that said Letters Patent are hereby corrected as shown below:

Column 1, line 25, "lace" should read --place--;

Column 1, line 66, "comparised" should read --comprised--;

Column 2, line 29, "shocks or" should read --shocks of--/

Signed and Sealed this

First Day of May 1979

[SEAL]

Attest:

RUTH C. MASON
Attesting Officer

DONALD W. BANNER
Commissioner of Patents and Trademarks